(12) United States Patent
Wilkes (10) Patent No.: US 6,978,349 B1
(45) Date of Patent: Dec. 20, 2005

(54) ADAPTIVE CACHE MEMORY MANAGEMENT

(75) Inventor: John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 10/339,206

(22) Filed: Jan. 9, 2003

(51) Int. Cl.[7] .............................................. G06F 12/00
(52) U.S. Cl. ..................... 711/118; 711/154
(58) Field of Search ................ 711/118, 134, 137–139, 711/154

(56) References Cited

U.S. PATENT DOCUMENTS

| | | | | |
|---|---|---|---|---|
| 5,025,366 A | * | 6/1991 | Baror | 711/128 |
| 5,524,203 A | | 6/1996 | Abe | |
| 5,809,560 A | | 9/1998 | Schneider | |
| 5,931,945 A | * | 8/1999 | Yung et al. | 712/300 |
| 6,295,582 B1 | | 9/2001 | Spencer | |
| 6,457,105 B1 | | 9/2002 | Spencer et al. | |
| 6,493,801 B2 | | 12/2002 | Steely, Jr. et al. | |
| 6,766,431 B1 | * | 7/2004 | Moyer | 711/168 |

OTHER PUBLICATIONS

U.S. Appl. No. 09/985,426, filed Apr. 27, 2004, Wilkes et al.
John Green, RAID Performance Configuration, Jun. 1999, Windows NT Magazine, Penton Media, Inc., Loveland, CO.

* cited by examiner

Primary Examiner—Matthew D. Anderson (57) ABSTRACT

Techniques for adaptive cache memory management. A computer system with a cache memory is operated under different conditions. Resulting performance is measured and, in response, the operating conditions are maintained or changed in order to optimize performance. By repeatedly examining the performance of the computer system under different conditions and making adjustments to the system in response, optimal performance can be maintained despite changes in workload.

22 Claims, 3 Drawing Sheets

ADAPTIVE CACHE MEMORY MANAGEMENT

FIELD OF THE INVENTION

The present invention relates to the field of computer systems. More particularly, the present invention relates to cache memory in computer systems.

BACKGROUND OF THE INVENTION

A typical computer system includes one or more host systems and one or more storage systems. A storage system typically provides relatively large-scale, non-volatile storage of data which may be accessed by a host system. A host system typically accesses a storage system by performing write and read operations to and from the storage system via a communication path or network between the host and storage system.

A typical host system includes a host processor and a host cache. The host processor executes application programs that require access to data and that may also modify the data or generate new data. The host cache temporarily holds data for use by the host processor. Because communication delays are reduced, the host processor can access the information held in the host cache more quickly than data held in the storage system. Accordingly, when the host processor requires access to data, the host cache is first checked to determine whether the requested data is present in the host cache. If so, the data can be retrieved more quickly, improving system performance. If the data is not present in the host cache, it can be retrieved from the storage system.

In addition, the storage system commonly includes a mass-storage medium, such as a hard disk or a disk array, and a storage system cache. A typical storage system cache temporarily holds information obtained from the mass-storage medium or information that is to be stored in the mass-storage medium. Because access times for the storage system cache are typically less than access times for the mass-storage medium, information held in the storage system cache can be accessed by the host system more quickly than data held in the mass-storage medium. Accordingly, where requested data is to be retrieved from the storage system, the storage system cache is first checked to determine whether the requested data is present in the storage system cache. If so, the data can be retrieved more quickly than from the mass-storage medium. If the data is not present in the storage system cache, it can be retrieved from the mass-storage medium.

In addition, the storage system cache typically serves as a buffer for write operations. More particularly, where the host system sends data to be stored by the storage system, the data is first received into the storage system cache and then the data is written to the mass-storage medium.

A variety of techniques are known for enhancing performance of a system that includes a cache memory. Examples include read-ahead, in which data at memory locations that follow requested data is also retrieved and made ready in cache memory in case it is requested, and asynchronous write operations, in which data to be written to mass-storage is buffered in cache memory while awaiting completion of the writing and while other operations are allowed to commence. However, using these techniques generally involves tradeoffs and, as a result, they do not always improve performance. For example, data retrieved for a read-ahead operation occupies space in cache memory that would otherwise be available for other uses that might have a greater impact on performance depending on the circumstances.

What is needed is a technique for managing cache memory for more efficiently utilizing techniques intended to improve performance. It is to these ends that the present invention is directed.

SUMMARY OF THE INVENTION

The present invention is directed toward adaptively managing cache memory. In one aspect, a computer system having at least one cache memory is operated in a first operative condition of the cache memory and a performance level resulting from the first operative condition determined. In the first operative condition, a performance-affecting technique, such as cache read-ahead, may be enabled. The computer system is operated in a second operative condition of the cache memory and a performance level resulting from the second operative condition is determined. In the second operative condition, the performance-affecting technique is altered, e.g., cache read-ahead may be disabled. A selection is made from among the operative conditions according to the relative resulting performance levels. Accordingly, the computer system is operated so as to optimize performance based on whether or not the performance-affecting technique actually enhances performance. To ensure that operation continues in an optimal manner, the operative condition of the cache memory may be repeatedly altered (e.g., at regular or irregular intervals) and its operative condition selected according to resulting performance levels. For example, where cache read-ahead is enabled, it may be disabled after a time to determine whether this would improve performance. Operation may then resume with the cache-ahead enabled or disabled, depending upon which results in better performance.

In another aspect, a computer system having at least one cache memory is operated with the cache memory conditioned in accordance with each of a plurality of performance-affecting settings and relative resulting performance is determined. For example, the computer system may be operated using various different cache read-ahead data quantities (e.g., 32 KB, 64 KB and 128 KB) and the resulting performance measured for each. For example, each setting is tried for a specified period of time before trying the next. A performance-affecting setting is selected from among the plurality of settings according to the relative resulting performance. The computer system is then operated with the cache memory conditioned in accordance with the selected performance-affecting setting. Accordingly, the computer system is operated so as to optimize performance based on which setting results in best performance. The performance-affecting setting may be repeatedly adjusted based on resulting performance. For example, where read-ahead operations are performed by using a 64 KB quantity to be retrieved, the quantity may be increased or decreased after a time to determine whether this would improve performance. Operation may then resume with a quantity which results in better performance.

These and other aspects of the invention are described in more detail herein.

DETAILED DESCRIPTION OF A PREFERRED EMBODIMENT

The present invention provides techniques for adaptive cache memory management. A computer system with a cache memory is operated under different conditions. Resulting performance is measured and, in response, the operating conditions are maintained or changed in order to optimize performance. By repeatedly examining the performance of the computer system under different conditions and making adjustments to the system in response, optimal performance can be maintained despite changes in workload.

The invention is applicable to any computer system that includes at least one cache memory. For example, a computer system, such as a host system having a host cache memory may be coupled to a storage system having a storage system cache memory. The host cache memory may be considered a primary cache since it has the lowest access latency from the point-of-view of the host processor. The storage system cache memory may be considered a secondary cache since it will often have higher access latency from the point of view of the host system. This additional latency is due to the host system and the storage system typically being separated by a communication link (e.g., a bus) or a network (e.g., a SAN, or Storage Area Network).

While the present invention is described in the context of one or more host systems coupled to one or more storage systems, it will be apparent that the invention can be applied to any computer system in which one or more levels of cache memory are provided. For example, the cache memory management techniques described herein may be applied to processor caches. In such a system, L1 (level-one) memory may function as the primary cache, L2 (level-two) memory may function as the secondary cache, and main memory may function as a third level of memory).

It may also be employed in the context of any kind of system that has a cache, including a storage system connected to a host system—e.g., a database server, file server, disk array, or disk drive.

Figure 1:
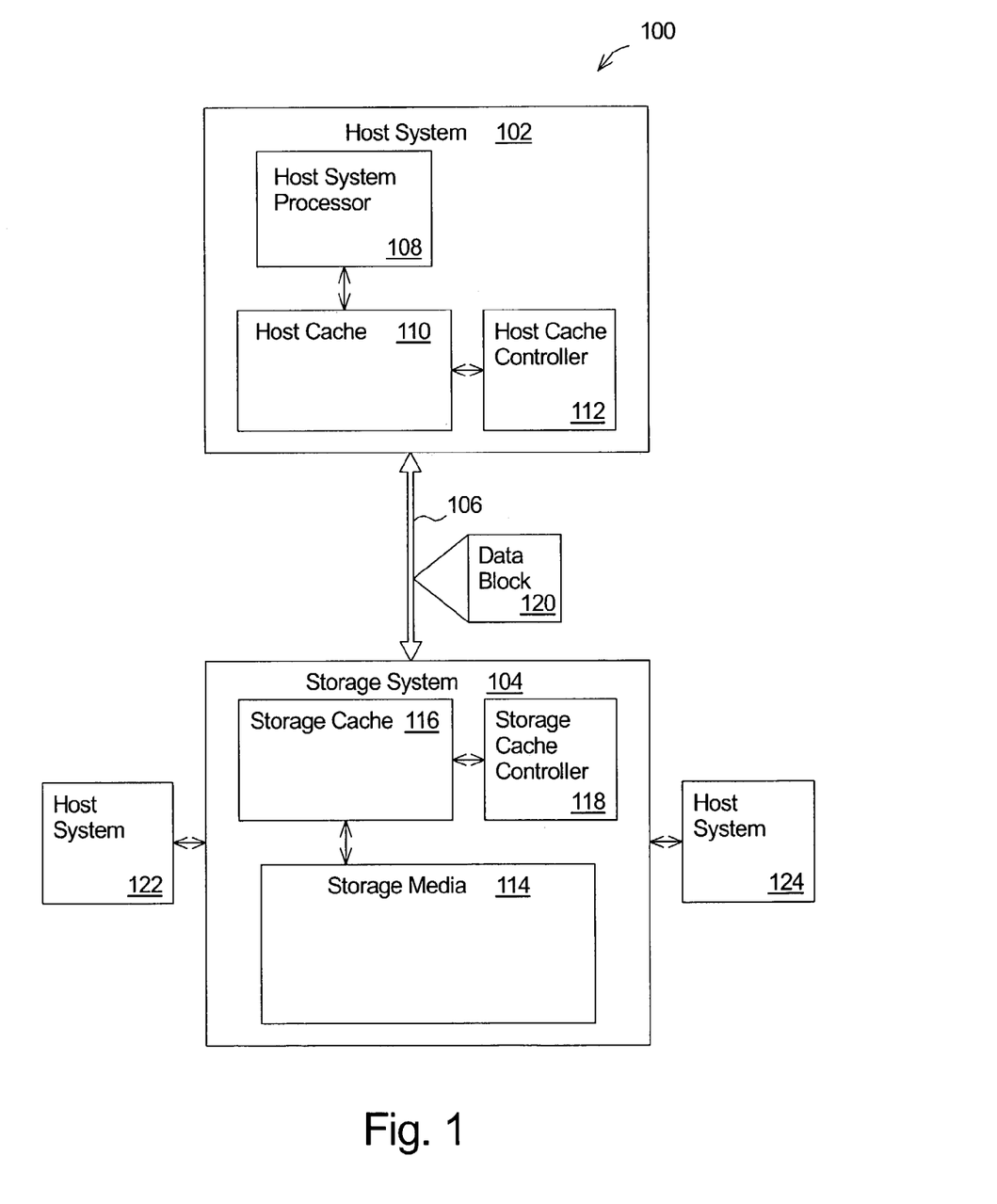
FIG. 1 illustrates a computer system in which the present invention may be implemented.

FIG. 1 illustrates a computer system 100 in which the present invention may be implemented. A host system 102 and a storage system 104 communicate via a communication path 106. The host system 102 includes a host processor 108, a host cache 110 and a host cache controller 112. The storage system 104 includes a storage media 114 and may also include a storage system cache 116, and a storage cache controller 118.

The host system 102 may be any type of system which generates or modifies data. For example, the host system 102 may include a personal computer or workstation that runs one or more application programs, such as a word-processing application. In addition, the host cache controller 112 of the host system 102 manages the host cache 110. The host cache 110 may be any type of memory system used to store data for faster access by the host processor 108.

The storage system 104 may be any type of storage system that is capable of holding data for access by the host system 102. In one embodiment, the storage media 114 includes a hard disk drive, though the storage media may include a disk array, or other type of storage media, such as solid-state memory, magnetic tape or optical media. In addition, the storage system 104 may include a storage system cache 116 and a storage cache controller 118 that controls operation of the storage cache 116. Further, the storage media 114 may include a lower-level cache memory, which may, in turn, be fronting still lower-levels in a storage hierarchy.

The storage system 104 may perform the functions of a storage server for multiple host systems that access the storage system 104 using any one or more known client-server communication protocols. In which case, the communication path 106 may be part of a communication network.

The host system 102 obtains information from the storage system 104 by performing read operations via the communication path 106 and transfers information to the storage system 104 by performing write operations via the communication path 106.

In one embodiment, the host cache 110 and the storage system cache 116 are organized into sets of information. These sets of information may be referred to as data blocks, cache blocks, cache lines or data lines. Each data block is associated with a particular memory address whether the data block is stored in a cache or other storage media. It is usual, although not required, that there is just one address associated with each "clean" data block in the storage system cache 116; high-availability storage systems may keep two or more copies of data blocks in separate parts of the storage system cache 116, in order to reduce the risk of losing data.

When host processor 102 requires access to data, it may first check the host cache 110 to determine whether the requested data is contained therein. If the requested data is present in the host cache 110, the data may be retrieved from the host cache 110. If the data referenced in the read operation is not held in the host cache 110, the host system 102 may then obtain the data from the storage system 104 via the communication path 106.

In response to a read operation by the host system 102, the storage system 104 may first check the storage cache 116 to determine whether the requested data is contained therein. If the requested data is present in the storage cache 116, the data may be retrieved from the storage cache 116 and communicated to the host system 102. For example, the data block 120 illustrated in FIG. 1 may be communicated to the host system 102. This generally includes copying the data to the host system cache 110 so that the data will be more readily available if needed again.

If the requested data is not present in the storage cache 116, the data may be obtained from the storage media 114. More particularly, where the data is not present in the storage cache 116, it may be copied from the storage media 114 to the host system 102. This may include copying the data to the storage cache 116 and/or to the host cache 110 so that the data will be more readily available if needed again. In one aspect, the system 100 may perform read-ahead operations, in which data at memory locations which follow the requested data is also retrieved and made ready in the host cache 110 and/or storage cache 116 in case it is requested.

When the host system 102 modifies previously requested data (or if the host system 102 generates new data), it may be desired to store the data in the storage system 104. Newly-generated or recently-modified data may be stored at the host cache 110 and marked as "dirty" to indicate that the data has not yet been forwarded to the storage system 104.

To forward the "dirty" data at the storage system 104, the host system 102 issues a write request to the storage system 104 and forwards the data to the storage system 104. For example, the data block 120 illustrated in FIG. 1 may be forwarded to the storage system 104. In response, the storage system 104 may receive the data into the storage cache 116. In addition, the data may be immediately stored in the storage media 114 or stored in the storage media 114 after a delay while the data is held in the storage cache 116. Once the data has been forwarded to the storage system 104, the host system 102 may mark the data as "clean."

Where data is transferred into the host cache 110 or into the storage cache 116, this will generally require eviction of other data in order to make room for the new data being transferred in. Data is evicted by making its memory locations available to be overwritten by the new data, possibly after writing out the data previously held there.

The storage system 104 may be in communication with one or more additional host systems for storing and retrieving data objects, thereby sharing resources of the storage system 104. For example, the computer system 100 may include host systems 122 and 124 that operate in the same manner as the host system 102. In addition, the system 100 may include one or more additional storage systems that are accessible by one or more host systems.

A variety of techniques for operating cache memory may be employed by the computer system 100 for enhancing performance of the system 100. Examples of performance-affecting techniques include read-ahead operations, in which data at memory locations that follow requested data is also retrieved and made ready in cache memory (e.g., in the host cache or the storage cache 116) in case it is requested. Another example is asynchronous write operations, in which data to be written to mass-storage 114 is buffered in the storage cache memory 116 while awaiting completion of the writing and in which other operations are allowed to commence before the write operation is complete.

Other examples of performance-affecting techniques include schemes for determining which data to evict from cache memory in order to make room for data to be inserted to the cache memory. For example, the host system 102 may implement a least-recently used (LRU) replacement policy, a most-recently used (MRU) replacement policy, a most-frequently replaced (MFR) replacement policy, or variations thereof, for the host cache 110. It will be apparent that these are only examples of suitable replacement policies and that others may be employed.

Further, when a data block is evicted (e.g., from the host cache 110), rather than simply discarding the data block, the data block may be moved or "demoted" to a lower-level cache (e.g., the storage cache 116). This is done in an effort to maintain different data in the different levels of cache. This is expected to increase the total data stored in cache and, thus, to increase the frequency that requested data will be found in at least one cache (i.e. the cache hit rate is expected to be increased). In one embodiment, this is accomplished through use of a "demote" operation, as described in detail in U.S. application Ser. No. 09/641,383, filed Aug. 17, 2000, and entitled, "Exclusive Caching in Computer Systems," the contents of which are hereby incorporated by reference. In another embodiment, moving a data block ready for eviction to a lower level cache may be accomplished through use of a read or a write operation, as described in detail in U.S. application Ser. No. 10/324,226, filed Dec. 19, 2002, and entitled, "Techniques for Cash Memory Management Using Read and Write Operations," the contents of which are hereby incorporated by reference.

It will be apparent that the above-described performance-affecting techniques are exemplary and that different performance-affecting techniques may be used in conjunction with the present invention.

All of the above-described performance-affecting techniques and many others involve tradeoffs. As a result, they do not always improve performance. Thus, the computer system 100 is operated with one or more of the cache memories 110 and 116 under different conditions. Resulting performance is measured and, in response, the operating conditions are maintained or changed in order to optimize performance.

Some performance-affecting techniques can be selectively employed or not employed. In other words, the computer system 100 may be operated with the technique either enabled or disabled (i.e. selected or not selected). For example, cache read-ahead can be operated in which a predetermined quantity (e.g., 64 KB) of additional data retrieved into cache for each read operation or the technique can be disabled in which no additional data is retrieved beyond that actually referenced by each read operation. As another example, replacement policies, such as LRU, MRU and MFR, can each be selectively enabled or disabled, though some replacement policy is generally required to be employed at any given time. As another example, the technique of moving (i.e. demoting) data evicted from host cache 102 to the storage cache 116 can be enabled or disabled. As yet another example, a rate control on issuing input/output operations (I/Os) can be placed on the host system 102 so as to limit network traffic and/or a communication bottleneck from occurring at the storage system 104; thus, the rate control can be enabled or disabled.

In addition, some performance-affecting techniques can be employed to different degrees or under difference operational conditions or incremental settings, as opposed to being completely disabled or enabled. For example, where cache read-ahead is enabled, various different read-ahead quantities can be specified (e.g., 32 KB, 64 KB, 128 KB, etc.) for data that is to be retrieved in addition to the data actually requested. As another example, where a rate control is placed on the host system 102, the maximum rate of I/Os allowed can be adjustable at any level up to the maximum I/O rate of which the host system 102 is capable.

Figure 2:
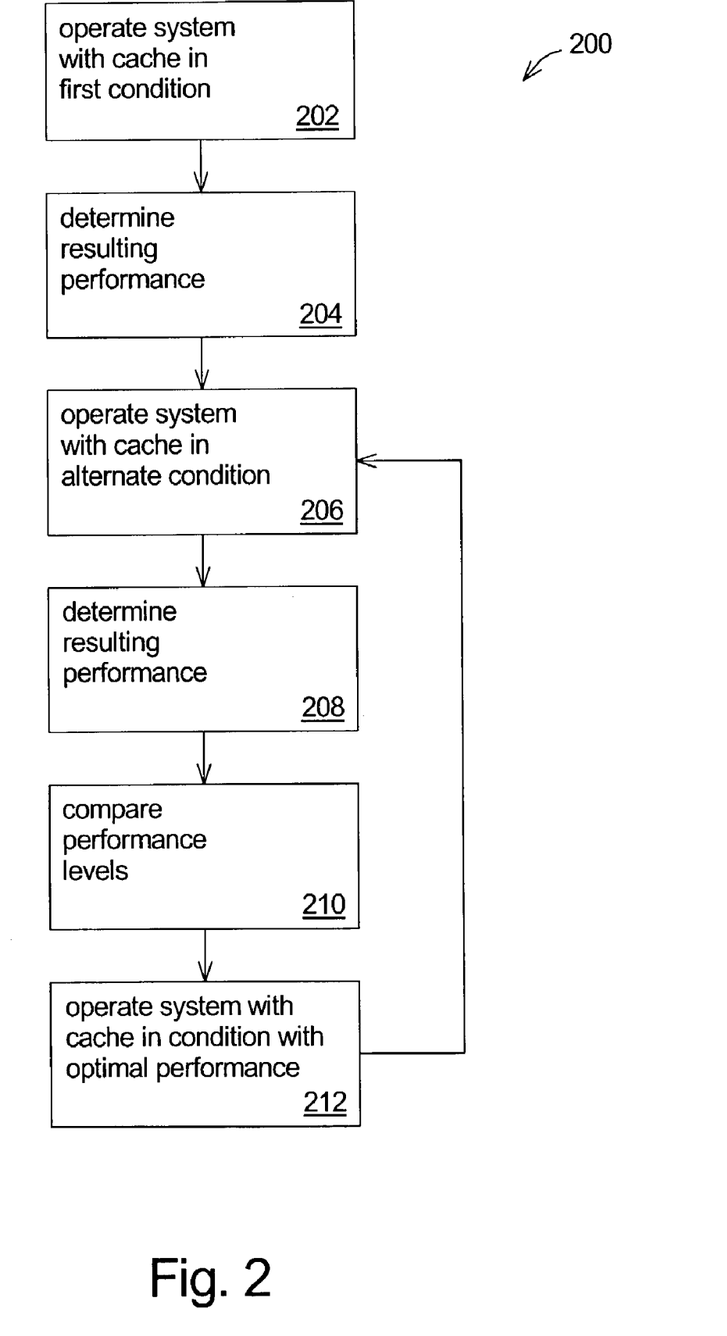
FIG. 2 illustrates a flow diagram of a method for adaptive cache memory management in accordance with an aspect of the present invention.

FIG. 2 illustrates a flow diagram of a method 200 for adaptive cache memory management in accordance with an aspect of the present invention in which a performance-affecting technique is enabled or disabled. Operation of the computer system 100 of FIG. 1 may be controlled in accordance with the diagram of FIG. 2. For example, the method 200 of FIG. 2 may be stored in machine-readable form as a sequence of machine-executable steps according to which various elements of FIG. 1, such as the host processor 108, the host cache controller 112 and/or the storage system cache controller 118, are controlled to operate.

Program flow may begin at step 202 in which the system 100 is operated with one or more of the cache memories 110 and 116 in a first condition. For example, the system 100 may be configured such that an additional 64 KB of data is retrieved for each read operation directed to the storage system 104. Thus, in this example, read-ahead is enabled for all read operations.

From step 202, program flow moves to a step 204 in which performance of the system 100 resulting from the first condition is determined. For example, a metric representative of a mean cache hit rate observed for a predetermined period of time may be determined in step 202. The cache hit rate may be determined as a fraction of all read operations directed to the storage system 104 for which the requested data is found in either the host cache 110 or the storage system cache 116. In other embodiments, different measures of performance may be used, such as mean request latency for read requests or a network queue length where multiple hosts share a network. Further, the performance determined in step 204 may be based on a combination of measures, e.g., a performance metric may be determined as a weighted sum of several other metrics.

It will be apparent that the steps of determining system performance may be performed simultaneously with the corresponding step of operating the system 100. In other words, determining performance in step 204 may be performed while the system is operated as in step 202. Once the system 100 has been operated in step 202 for a sufficient period of time to obtain an adequate number of data samples for determining the performance metric in step 204, program flow may move to a step 206.

The system 100 is then operated in step 206 under alternate conditions. For example, where cache read-ahead is enabled for steps 202 and 204, cache-read ahead may then be disabled in step 206. In step 208, performance of the system 100 resulting from the alternate condition is determined. Preferably, the same performance metric used in step 204 is obtained in step 208 (though with the system 100 operating under different conditions) so that the results can be readily compared in step 210. Also, performance of step 208 may overlap that of step 206. The duration used in step 208 should preferably be determined in order to allow adequate confidence in the comparison step 210. To achieve this, it may use a fixed interval, an approximately fixed interval, an interval determined from counting events (e.g., I/O requests), or adapt the interval based on preliminary statistical metrics associated with the performance metric. For example, if an early estimate of the performance metric is significantly different from that obtained in step 204, the interval may be curtailed.

Then, in step 210 the performance metrics obtained in steps 204 and 208 are compared to determine which operative condition results in better performance. In the example, assume that in step 204 with cache read-ahead enabled, the resulting mean hit rate is determined to be 0.28, whereas, with cache read-ahead disabled the mean hit rate is determined in step 208 to be 0.34. Since memory accesses are generally faster when the data is found in cache, a higher hit rate generally indicates better performance.

In step 212, the operative condition that results in higher performance is selected and operation of the system 100 is resumed using this selected condition. In the example, because the higher hit rate of 0.34 was achieved with cache read-ahead disabled, this condition is selected and operation of the system 100 is resumed with cache-read ahead disabled. Preferably, monitoring of the performance of the system 100 continues in step 212.

After a time, program flow returns to step 206 in which the operative condition of the system 100 is again changed (step 206) and the performance is measured (step 208) and the condition which results in the best performance is selected (step 212). This process of may be repeated at regular, periodic intervals or at irregular (e.g., random or pseudo-random) intervals. Irregular intervals may be used in order to avoid having the measurement periods correlate to a periodic characteristic of the workload.

Thus, by repeatedly examining the performance of the computer system 100 under different settings and making adjustments to the system in response, optimal performance can be maintained despite changes in workload. Thus, changes in workload that could affect the system performance are taken into account in selecting the operational condition of the system 100. In one aspect, the intervals during which the system 100 is operated in step 212 are longer than the measurement intervals during which the system is operated in steps 206 and 208 in an attempt to maximize the proportion of time that the system 100 is operated with then-current optimal performance.

Additional considerations are preferably taken into account when determining which settings the system is operating under. These may include the cost of operating under particular settings (e.g., different settings may use different system resources resulting in different costs). Thus, for example, if the performance metrics obtained in steps 204 and 206 are similar, then the system may be operated using the less costly setting. They may also include the estimated or known cost of switching configurations: for example, if the cost of switching configurations is high (e.g., because switching is disruptive), then the current settings may be retained for a longer period of time, or as another example, the benefit to be obtained by a switch may have to be greater than some threshold, in order to avoid switching too frequently.

While the method 200 of FIG. 2 assumes that there are two operative conditions, for example, where a technique is enabled or disabled, the method may be modified for use where there are multiple operative conditions. This may be accomplished by performing the operation/measurement steps (206 and 208) for each condition. The performance of all the possible operative conditions may be measured before any condition is selected in a first pass through step 212. Alternately, an operative condition may be selected in a first pass through step 212 after the performance of fewer than all of the possible conditions has been measured; in which case, the other conditions may be examined during subsequent intervals (by returning to the step 206 from the step 212).

For example, the method 200 of FIG. 2 may used where three eviction policies (e.g., LRU, MRU and MFR) are employed. Thus, operation/measurement steps may be performed for each of the three policies before one is selected in step 212 or the operation/measurement steps may be performed for just two of the conditions before one of the two is selected in step 212.

Also, once one of the multiple conditions is selected in step 212, in a next pass through the step 206, fewer than all of the other conditions may be examined. Then, in step 212, only those conditions for which the performance was examined may be compared in step 210. Alternately, in a next pass through step 206 all of the other conditions may be examined before selecting one in step 212. In either case, all of the conditions are preferably examined within a time-frame that allows the overall system performance to remain optimized without excessive interference with its operation, such as might occur if the operational conditions are changed too frequently.

Figure 3:
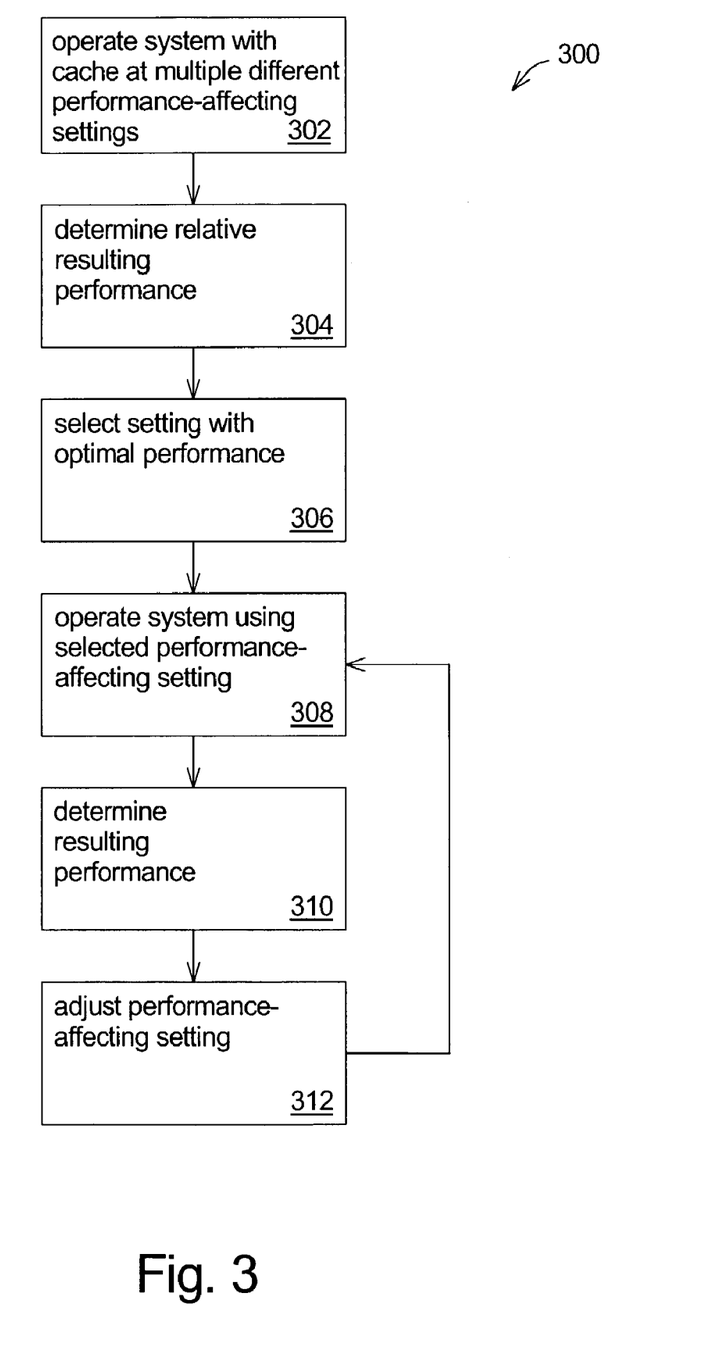
FIG. 3 illustrates a flow diagram of a method for adaptive cache memory management in accordance with another aspect of the present invention.

FIG. 3 illustrates a flow diagram 300 of a method for adaptive cache memory management in accordance with an aspect of the present invention in which a performance-affecting technique is incrementally adjusted. Operation of the computer system 100 of FIG. 1 may be controlled in accordance with the diagram of FIG. 3. For example, the method 300 of FIG. 3 may be stored in machine-readable form as a sequence of machine-executable steps according to which various elements of FIG. 1, such as the host processor 108, the host cache controller 112 and/or the storage system cache controller 118, are controlled to operate.

Program flow may begin at step 302 in which the system 100 is operated with one or more of the cache memories 110 and 116 in each of multiple different settings. For example, the system 100 may be configured such that an additional 32 KB of data is retrieved for each read operation directed to the storage system 104. Then, the system 100 is operated to obtain a sufficient number of samples to compute a performance metric, such as mean cache hit rate. Once sufficient samples are taken with the 32 KB setting, the system 100 may be configured such that an additional 64 KB of data is retrieved for each read operation directed to the storage system 104. Then, the system 100 is operated to obtain a sufficient number of samples to compute a performance metric, such as mean cache hit rate.

This process may be repeated for each setting desired (e.g., 32 KB, 64 KB, 128 KB, etc.). Then, in step 306 the setting that results in better performance is selected. For example, assume that the mean hit rate for the 32 KB setting is 0.30, the mean hit rate for the 64 KB setting is 0.28 (as in the example of FIG. 2) and the mean hit rate for the 128 KB setting is 0.21. Thus, because a higher hit rate indicates better performance, the 32 KB may be selected in step 306.

Alternately, rather than try every possible setting before making a selection in steps 302 to 306, fewer settings may be tried before making a selection. For example, some of the possible settings may be randomly selected for determining their resulting performance. However, a technique is preferably used in an attempt to zero-in on a setting based on prior results. For example, a binary search technique may be used in which possible settings are divided into two groups and one setting from each group is selected to take measurements. Then, the group that includes the setting that results in comparatively better performance is further divided. This process may be then continued for a selected number of iterations. Variations include sub-dividing the groups into three or more groups and taking measurements using a selected setting from each of the three or more groups.

As another example, the setting may be incrementally increased/decreased (e.g., linearly or exponentially) so long as improvements in performance are observed for successive settings. Then, when improvements in performance are no longer observed, the setting with the highest observed performance may be selected. Alternately, when improvements in performance are no longer observed, a back-off technique may be used in which the setting is then decreased/increased in smaller increments in an attempt to locate a maximum. Table 1 below illustrates an example of how this may be accomplished:

TABLE 1

| Iteration# | Setting | Observed Performance |
| --- | --- | --- |
| 1 | 0 | 100 |
| 2 | 15 | 90 |
| 3 | 30 | 80 |
| 4 | 45 | 70 |
| 5 | 60 | 80 |
| 6 | 55 | 75 |
| 7 | 50 | 68 |

In the example of Table 1, the column entitled "Iteration" indicates the number of the current measurement iteration. Each entry in the "Setting" column represents a rate control setting in which a higher number indicates a higher limit on the number of I/O's that can be issued. Each entry in the "Observed Performance" column represents the mean request latency resulting from the corresponding setting in which a lower number indicates better performance. Thus, in each iteration is represented as a row in Table 1 having a corresponding performance (e.g., a read request latency) that is observed for a particular setting (e.g., a rate control setting).

As can be seen from Table 1, the rate control setting is linearly increased for iterations #1–4 (i.e. the settings are: 0, 15, 30 and 45). In response, the mean latency measurements are successively lower for iterations #1–4 (i.e. the measured performance is: 100, 90, 80 and 70). This indicates that the observed performance is gradually increasing. However, in iteration #5, the rate control setting is increased to 60, the observed performance is 80. This means that the observed performance has worsened. Thus, in the first five iterations, the best performance is observed at the setting of 45. Accordingly, this setting may be selected in step 306.

Alternately, rather than stop at the fifth iteration, additional settings may be tried in an attempt to improve the obtained performance. Thus, the settings may be adjusted in the opposite direction to that of iterations #1–5, but by a smaller increment. More particularly, because the performance went down from its prior trend of increasing between successive iterations 4 and 5, additional settings may be tried between those of iterations 4 and 5. Thus, for example, as shown in Table 1, in iteration #6, the setting is reduced to 55; the resulting performance observed is 75. This is better than the performance for iteration #5, but worse than for iteration #4. Thus, in iteration #7, the setting is again reduced, this time to 50; the resulting performance is 68, which is the lowest so far. Thus, the setting of 50 may be selected in step 306. It will be apparent that further iterations may be tried in an attempt to improve the performance even more.

In step 308, the system 100 is operated using the performance-affecting setting selected in step 306. In step 310, performance resulting from this setting is determined. For example, the performance may be monitored continuously or at intervals. Then, in step 312, the performance-affecting settling may be adjusted in attempt to improve the performance. The system may then be operated at the new setting (step 308), the performance measured (step 310) and a new setting selected (312). As in the method 200 of FIG. 2, this process of FIG. 3 may be repeated at regular, periodic intervals or at irregular (e.g., random or pseudo-random) intervals.

The adjustment in each pass through step 312 may be performed by incrementally increasing or decreasing the current setting depending on the circumstances. For example, if the setting is increased and this improves the performance, then the setting may be increased again in a next pass through the step 312. However, if the setting is increased and this does not improve the performance, then the setting may be decreased in a next pass through the step 312.

By repeatedly examining the performance of the computer system 100 under different settings and making adjustments to the system in response, optimal performance can be maintained despite changes in workload.

It will be apparent that certain ones of performance-affecting techniques need not be performed for all data being read from storage or written to storage. Rather, one or more performance-affecting techniques may be employed only for selected types or classes of data in a given system. For example, where a storage server is shared by multiple host systems, it may be desired to demote only shared data. Further, different settings can be used for different data. For example, read-ahead operations initiated by one host system may be performed using 64 KB read-ahead quantities, whereas read-ahead operations for another host system by performed using a different quantity. Where any performance-affecting technique is employed in a system in which a cache memory is shared (e.g., where multiple host systems have shared access to a storage system that includes a storage system cache), the performance-affecting technique can be selectively enabled for only certain ones of the host systems or can be enabled for the entire system including all of the host systems.

Further, while the method 200 of FIG. 2 is described in connection with a performance-affecting technique is enabled or disabled and the method 300 of FIG. 3 is described in connection with a performance-affecting technique in which a setting can be incrementally increased or decreased, it will be apparent that aspects of these method can be used together. For example, read-ahead can be enabled or disabled and can also be adjusted incrementally. Thus, a method may be employed in which read-ahead is disabled or enabled at a various different settings, depending upon which results in the best performance. As another example, it may be desired to employ and optimize multiple performance-affecting techniques in a single computer system. For example, it may be desired to employ read-ahead and rate control in the computer system 100. Further, such techniques can interact with each other. For example, the optimal read-ahead setting (32 KB, 64 KB or 128 KB, etc.) may depend on the degree that rate control is employed. Thus, it will be apparent that aspects of the methods 200 and 300 may be used simultaneously in one computer system to make selections and adjust settings for multiple performance-affecting techniques.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of managing a cache memory comprising steps of:
   operating a computer system having at least one cache memory in a first operative condition of the cache memory and determining a performance level resulting from the first operative condition;
   operating the computer system in a second operative condition of the cache memory and determining a performance level resulting from the second operative condition;
   comparing the determined performance levels and selecting from among a plurality of operative conditions of the cache memory according to results of the comparing, the plurality of operative conditions including at least the first and the second operative conditions;
   operating the computer system in accordance with the selected one of the plurality of operative conditions and determining a performance level resulting from the selected one of the operative conditions; and
   the computer system switching from the selected one of the plurality of operative conditions to another one of the plurality of operative conditions based on the performance level resulting from the selected one of the operative conditions.

2. The method according to claim 1, further comprising repeatedly switching from one of the plurality of the operating conditions to another according to relative determined performance levels.

3. The method according to claim 2, wherein switching from one of the plurality of the operating conditions to another is performed at regular intervals.

4. The method according to claim 2, wherein switching from one of the plurality of the operating conditions to another is performed at irregular intervals.

5. The method according to claim 2, wherein said selecting is further performed according to a cost of switching from one of the operative conditions to another one of the operative conditions.

6. The method according to claim 2, wherein duration of intervals between switching from one of the plurality of the operating conditions to another are determined according to a cost of switching from one of the operative conditions to another one of the operative conditions.

7. The method according to claim 2, wherein a difference in performance must exceed a threshold before switching from one of the operative conditions to another one of the operative conditions.

8. The method according to claim 1, wherein the first and second operative conditions are selected from the group consisting of a performance-affecting technique being enabled and the performance-affecting technique being disabled.

9. The method according to claim 8, wherein the performance-affecting technique comprises cache read-ahead.

10. The method according to claim 8, wherein the performance-affecting technique comprises cache demotion.

11. The method according to claim 8, wherein the performance-affecting technique comprises input/output rate control.

12. The method according to claim 8, wherein the first operative condition comprises a first performance-affecting technique being enabled and a second performance-affecting technique being disabled and the second operative condition comprises the first performance-affecting technique being disabled and the second performance-affecting technique being enabled.

13. The method according to claim 12, wherein said plurality of operative conditions of the cache memory comprises a third operative condition in which a third performance-affecting technique is enabled and the first and second performance-affecting techniques are disabled.

14. The method according to claim 13, wherein the first, second and third performance-affecting techniques comprise replacement policies for data to be evicted from cache memory.

15. The method according to claim 1, wherein said switching is further performed according to relative cost of operation in accordance with the operative conditions.

16. A method of managing a cache memory comprising steps of:
   operating a computer system having at least one cache memory with the cache memory conditioned in accordance with each of a plurality of performance-affecting settings; and
   the computer system determining relative resulting performance, selecting a performance-affecting setting from among the plurality according to the relative resulting performance and operating with the cache memory conditioned in accordance with the selected performance-affecting setting, said operating and selecting being performed in accordance with binary searching for optimizing the performance-affecting setting.

17. A method of managing a cache memory comprising steps of:
repeatedly operating a computer system having at least one cache memory in each of a plurality of operative conditions of the cache memory and determining resulting performance levels; and
comparing the determined performance levels and selecting from among the operative conditions for operating the computer system according to results of the comparing wherein duration of intervals between switching from one of the plurality of the operating conditions to another are determined according to a cost of switching from one of the operative conditions to another one of the operative conditions.

18. A method of managing a cache memory comprising steps of:
repeatedly operating a computer system having at least one cache memory in each of a plurality of operative conditions of the cache memory and determining resulting performance levels; and
comparing the determined performance levels and selecting from among the operative conditions for operating the computer system according to results of the comparing wherein a difference in performance must exceed a threshold before switching from one of the operative conditions to another one of the operative conditions.

19. A method of managing a cache memory comprising steps of:
operating a computer system having at least one cache memory with the cache memory conditioned in accordance with each of a plurality of performance-affecting settings and determining relative resulting performance; and
selecting a performance-affecting setting from among the plurality according to the relative resulting performance and operating with the cache memory conditioned in accordance with the selected performance-affecting setting, wherein said operating and selecting are performed by incrementally altering the performance-affecting setting in a first direction so long as improvements are observed in resulting performance.

20. The method according to claim 19, further comprising altering the performance-affecting setting in a second direction opposite the first when improvements are no longer observed.

21. A machine readable media comprising computer code for implementing a method of managing a cache memory, the method comprising steps of:
operating a computer system having at least one cache memory in a first operative condition of the cache memory and determining a performance level resulting from the first operative condition;
operating the computer system in a second operative condition of the cache memory and determining a performance level resulting from the second operative condition;
comparing the determined performance levels and selecting from among a plurality of operative conditions for operating the computer system according to results of the comparing, the plurality of operative conditions including at least the first and the second operative conditions;
operating the computer system in accordance with the selected one of the plurality of operative conditions and determining a performance level resulting from the selected one of the operative conditions; and
the computer system switching from the selected one of the plurality of operative conditions to another one of the plurality of operative conditions based on the performance level resulting from the selected one of the operative conditions.

22. A method of managing a cache memory comprising steps of:
operating a computer system having at least one cache memory in a first operative condition of the cache memory and determining a performance level resulting from the first operative condition;
repeatedly operating the computer system in each of a plurality of operative conditions of the cache memory including the first operative condition of the cache memory and a second operative condition of the cache memory and, for each instance of operating the computer system in one of the operative conditions of the cache memory determining a performance level resulting from the operative condition of the cache memory under which the computer system is operating; and
the computer system switching from one of the plurality of operative conditions to another one of the plurality of operative conditions based on comparisons of performance levels.

* * * * *